Patented July 23, 1929.

1,721,882

UNITED STATES PATENT OFFICE.

RICHARD HERZ AND FRITZ SCHULTE, OF FRANKFORT-ON-THE-MAIN, AND WERNER ZERWECK, OF FECHENHEIM, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR CONVERTING CYANNAPHTHALENE-SULFONIC ACIDS.

No Drawing. Original application filed February 24, 1927, Serial No. 170,732, and in Germany May 17, 1926. Divided and this application filed November 10, 1927. Serial No. 232,466.

This application is a division of our Patent No. 1,677,086, filed February 24th, 1927.

We have found, that if cyannaphthalenesulfonic acids, containing at least one sulfonic group in ortho or para position to the cyanic group, are treated with an alkaline acting agent at elevated temperatures, this sulfonic group, standing in ortho or para position to the cyanic group, is easily exchanged for other monovalent radicles.

The products of conversion, thus obtained correspond to the general formula:

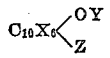

in which formula the group OY stands in ortho or para position to the group Z, the X's mean hydrogen atoms, of which one or more may be replaced by a monovalent substituent, Y means hydrogen or an alkyl residue, Z the groups CN, CONH$_2$ and COOH.

The general formula shows the range of substances, obtained according to the conditions applied. By acting with milder acting alkaline agents, the cyangroup of the employed cyannaphthalene-sulfonic acids remains unattached and hydroxy-cyannaphthalene-compounds are formed corresponding to the above formula, Y being hydrogen and Z being CN, by acting with stronger alkaline acting agents the cyangroup is saponified to the carboxyamido—(Z=CONH$_2$ in this case) or to the carboxy-group (Z=COOH in this case) whereas the sulfonic group is exchanged by hydroxyl (OH), when the applied alkaline acting agent is an aqueous caustic alkali, or by an alkoxy-group, generally when applying caustic alkalies in the presence of an alcohol. This latter reaction, by which an alkoxy-group is introduced into the molecule, is a particularly remarkable one without any analogy in the naphthalene series. In this manner especially alkoxynaphthalenecarboxyamids corresponding to the above formula, Z being CONH$_2$ and Y being an alkyl residue, and hydroxy- and alkoxynaphthoic acids are obtained corresponding to the above formula, Z being COOH and Y being hydrogen or an alkyl residue.

Under the term "alkaline acting agents" we understand caustic alkalies in the presence of water or of an alcohol, acting either at ordinary pressure or in a closed vessel at elevated pressure. Under milder acting alkaline agents the following have been found especially suitable: basic alkaline salts such as sodium, formate, acetate, borate, phosphate. Such agents, the caustic alkalies as well as the milder acting agents may be used advantageously in the presence of inorganic or organic diluents in order to keep the mass homogeneous and easily liquid, such as paraffine, naphthalene, tertiary aromatic bases as dimethylaniline or N-alkyl-carbazol, higher fatty acids, glycerine or low melting salts.

The aforesaid reactions take place at remarkably low temperatures, namely at about 80–250° C., whereas Royle and Shedler and Butler and Royle (see Journ. of Chem. Soc. London, vol. 123, pages 1641, 1649) must apply temperatures above 260–300° C. for exchanging the sulfonic group by the hydroxyl-group in the corresponding carboxynaphthalene-sulfonic acids.

The starting materials for these reactions, namely the ortho- and para-cyannaphthalenesulfonic acids and their nuclear substitution products, particularly those, containing a halogen or a further sulfonic group in the nucleus, are obtainable by diazotizing the corresponding aminonaphthalenesulfonic acids and treating the diazocompounds, thus obtained, with cuprous cyanide, according to Sandmeyer's reaction.

All products of conversion, derived therefrom, are important intermediates for the production of dyestuffs and pharmaceutical products.

In order to further illustrate our invention the following examples are given.

Example 1.

20 parts of the sodium salt of 2-cyannaphthalene-1-sulfonic acid (obtainable from 2-aminonaphthalene-1-sulfonic acid by Sandmeyer's reaction) are intimately mixed with about 40 parts of finely powdered caustic potash and about 150 parts of paraffine and the mixture is heated to about 140° C. while stirring. After some time the mass is cooled down, diluted with water and filtered. Upon acidifying the filtrate an evolution of sulfur dioxide occurs and a colorless compound separates out, forming long needles when recrystallized from dilute alcohol, melting at 179° C. The new compound combines with diazocompounds, forming azodyestuffs. According to the result of comparative synthetic and analytic reactions it seems to correspond to the following formula:

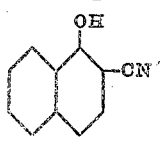

Instead of caustic potash also sodium acetate or formate with or without addition of paraffine or another suitable diluent may be used for the reaction. Also heating of the sodium salt of the cyannaphthalene-sulfonic acid by itself eventually with addition of sand or similar acting substances is sufficient by forming the cyannaphthol. This compound is converted into the corresponding 1-naphthol-2-carboxylic acid by treating it with alkaline saponifying agents, for instance by heating it with dilute caustic alkalies. If the sodium salt of 1-cyannaphthalene-4-sulfonic acid is treated in the same manner with a milder acting alkaline agent the corresponding 4-hydroxy-1-cyannaphthalene-compound is obtained.

*Example 2.*

4 parts of caustic potash and 1 part of water are heated in a suitable vessel until the mass is dissolved. Then 1 part of the sodium salt of 2-cyannaphthalene-1-sulfonic acid is added at about 150° C. The vessel is closed and then heating is continued under reflux. The temperature is slowly increased while stirring to about 200–220° C., and the mass is kept at this temperature until the evolution of ammonia ceases. After cooling down, the mass is dissolved in water and filtered. Upon acidifying the 1.2-hydroxynaphthoic acid of the formula:

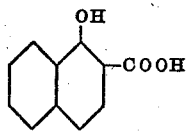

is separated. It melts at 186° C. and shows the properties mentioned in the literature.

When subjecting in the same manner the nuclear substitution products of the orth-cyannaphthalene-sulfonic acids, particularly those containing halogens or further sulfonic groups, to the action of alkaline agents, the corresponding derivatives of the products of conversion may be obtained. So for instance by treating 2-cyannaphthalene-3.6-disulfonic acid with caustic alkalies according to the conditions applied in this example a new acid is obtained, being probably 3-hydroxy-6-sulfo-naphthalene-2-carboxlic acid; by carrying out the process under more vigorous conditions, particularly at more elevated temperatures, as end product of the reaction 3.6-dihydroxy-naphthalene-2-carboxylic acid is formed.

*Example 3.*

10 parts of caustic potash and 1 part of water are heated in a suitable vessel until the mass is dissolved. Then 2 parts of the sodium salt of 1-cyannaphthalene-4-sulfonic acid are added at about 160° C. The vessel is closed and then heating is continued under reflux. The temperature of the mass is increased as quickly as possible to about 200° C. and the mass is kept at this temperature for a short time. After cooling down, it is diluted with water and almost neutralized, filtered from some impurities and the clear filtrate is acidified by means of hydrochloric acid. With an evolution of sulfur dioxide 1.4-hydronaphthoic acid of the formula:

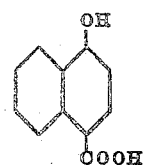

separates in the form of colorless needles. This acid shows all the characteristic properties and the melting point 184–185° C. described by Heller (Ber. d. Deutsch. Chem. Ges. vol. 45, 675).

The 1-cyannaphthalene-4-sulfonic acid may first be converted into the corresponding 4-sulfo-1-naphthoic acid for instance by heating it with a caustic potash solution of about 10% for some hours under reflux. It may be separated by acidifying and salting out the mass. By treating this acid with a caustic alkali in the same manner as described above at about 200° C., the 1.4-hydroxynaphthoic acid is also formed with an excellent yield in a pure state.

When subjecting in the same manner the nuclear substitution products of 1.4-cynnaphtholene-sulfonic acid such as the 6- and 7-sulfoderivatives (obtainable by treating the diazotized 1-naphthylamine-4.6- and -4.7-disulfonic acids (Dahl's acids II and III) with cuprous cyanide according to Sandmeyer's reaction) to the action of alkaline agents, the corresponding derivatives of the products of conversion may be obtained.

We claim:

1. The process which comprises treating with a caustic alkali at a temperature of from about 150° to about 250° C. a cyannaphthalene sulfonic acid of the general formula:

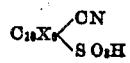

wherein the X's stand for hydrogen atoms of which one or more may be replaced by a monovalent substituent, and wherein the cyanogen and sulfonic acid groups stand in ortho or para position to each other.

2. The process which comprises heating a compound of the general formula:

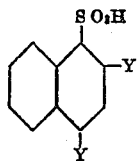

wherein Y represents hydrogen or a cyanogen group, one Y being hydrogen and the other Y being a cyanogen group, to a temperature of from about 150° to about 250° C. in the presence of a caustic alkali.

3. The process which comprises heating in a closed vessel one part of a compound of the general formula:

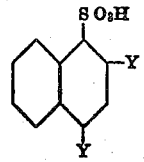

wherein Y represents hydrogen or a cyanogen group, one Y being hydrogen and the other Y being a cyanogen group, with from about 4 to 5 parts of caustic potash and from about ½ to 1 part of water to a temperature of from about 150° to about 220° C.

In testimony whereof, we affix our signatures.

RICHARD HERZ.
FRITZ SCHULTE.
WERNER ZERWECK.